US012281241B2

(12) United States Patent
Sahni et al.

(10) Patent No.: US 12,281,241 B2
(45) Date of Patent: Apr. 22, 2025

(54) POLYISOBUTYLENE ADHESIVE COMPRISING MULTIFUNCTIONAL COMPONENT WITH (METH)ACRYL OR VINYL ETHER GROUPS

(71) Applicant: 3M INNOVATIVE PROPERTIES COMPANY, St. Paul, MN (US)

(72) Inventors: Vasav Sahni, St. Paul, MN (US); Jason D. Clapper, Lino Lakes, MN (US); John W. McAllister, St. Paul, MN (US); Albert I. Everaerts, Tucson, AZ (US); Jacob P. Johnson, St. Paul, MN (US); Zhong Chen, Woodbury, MN (US); Ying Zhang, Woodbury, MN (US); Benjamin J. Bending, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 681 days.

(21) Appl. No.: 17/603,604

(22) PCT Filed: May 19, 2020

(86) PCT No.: PCT/IB2020/054744
§ 371 (c)(1),
(2) Date: Oct. 14, 2021

(87) PCT Pub. No.: WO2020/234774
PCT Pub. Date: Nov. 26, 2020

(65) Prior Publication Data
US 2022/0213358 A1 Jul. 7, 2022

Related U.S. Application Data

(60) Provisional application No. 62/851,326, filed on May 22, 2019.

(51) Int. Cl.
| | | |
|---|---|---|
| *C09J 123/22* | (2006.01) | |
| *C08F 220/18* | (2006.01) | |
| *C08F 222/10* | (2006.01) | |
| *C08K 5/01* | (2006.01) | |
| *C08K 5/3412* | (2006.01) | |

(52) U.S. Cl.
CPC ....... *C09J 123/22* (2013.01); *C08F 220/1818* (2020.02); *C08F 222/102* (2020.02); *C08K 5/01* (2013.01); *C08K 5/3412* (2013.01); *C09J 2301/30* (2020.08); *C09J 2423/00* (2013.01)

(58) Field of Classification Search
CPC .. C08F 220/1818; C08F 222/102; C08K 5/01; C08K 5/11; C08K 5/3412; C08L 23/22; C09J 123/22; C09J 2301/30; C09J 2423/00
See application file for complete search history.

(56) References Cited

U.S. PATENT DOCUMENTS

| | | |
|---|---|---|
| 8,232,350 B2 | 7/2012 | Fujita |
| 9,663,685 B2 | 5/2017 | Wang et al. |
| 10,106,708 B2 | 10/2018 | Bieber et al. |
| 2009/0026924 A1 | 1/2009 | Leung |
| 2012/0122359 A1 | 5/2012 | Lee |
| 2015/0056757 A1 | 2/2015 | Liu |
| 2016/0200949 A1 | 7/2016 | Lee |

FOREIGN PATENT DOCUMENTS

| | | |
|---|---|---|
| CN | 103797077 A | 5/2014 |
| CN | 105452352 A | 3/2016 |
| EP | 3112432 | 1/2017 |
| EP | 3275941 | 1/2018 |
| WO | WO 2018-178781 | 10/2018 |
| WO | WO 2018-178850 | 10/2018 |
| WO | WO 2019-168809 | 9/2019 |
| WO | WO 2020-012329 | 1/2020 |

OTHER PUBLICATIONS

International Search Report for PCT International Application No. PCT/IB2020/054744, mailed on Jul. 30, 2020, 4 pages.
ARKEMA_Sartomer®, Technical Data Sheet, CN308, Hydrophobic Acrylate Ester, Oct. 15, 2024, 1 page.
ARKEMA_Sartomer®, Technical Data Sheet, CN309, Hydrophobic Acrylate Ester, Oct. 15, 2024, 1 page.

*Primary Examiner* — Frances Tischler
(74) *Attorney, Agent, or Firm* — Carolyn A. Fischer

(57) ABSTRACT

An adhesive composition is described comprising a polyisobutylene polymer component; and up to 30 wt.-% of at least one aliphatic multifunctional component comprising at least two ethylenically unsaturated groups selected from (meth)acryl or vinyl ether. The monomer comprises a hydrocarbon moiety with greater than 12 contiguous carbon atoms. When the hydrocarbon moiety is branched, the hydrocarbon moiety comprises side chains with at least two carbon atoms. The aliphatic multifunctional component is sufficiently compatible such that crosslinked adhesive composition at a thickness of 20 microns has a haze of less than 3%. Also described are adhesive articles.

16 Claims, No Drawings

POLYISOBUTYLENE ADHESIVE COMPRISING MULTIFUNCTIONAL COMPONENT WITH (METH)ACRYL OR VINYL ETHER GROUPS

SUMMARY

An adhesive composition is described comprising a polyisobutylene polymer component; and up to 30 wt.-% of at least one aliphatic multifunctional component comprising at least two ethylenically unsaturated groups selected from (meth)acryl or vinyl ether. The monomer comprises a hydrocarbon moiety with greater than 12 contiguous carbon atoms. When the hydrocarbon moiety is branched, the hydrocarbon moiety comprises side chains with at least two carbon atoms. The aliphatic multifunctional component is sufficiently compatible such that crosslinked adhesive composition at a thickness of 20 microns has a haze of less than 3%. In typical embodiments, the polyisobutylene polymer component comprises unfunctionalized polyisobutylene polymer, butyl rubber or a mixture thereof. In some embodiments, the multifunctional component has a number average molecular weight, as determined by Nuclear Magnetic Resonance (NMR), of less than 3000 g/mole. In some embodiments, the multifunctional component, excluding the unsaturation of the (meth)acryl and vinyl ether, comprises less than 0.08 wt. % of ethylenic unsaturation as determined by NMR.

DETAILED DESCRIPTION

Presently described is an adhesive composition comprising a polyisobutylene polymer component that comprises one or more polyisobutylene polymers. Such polyisobutylene polymers may be homopolymers and/or copolymers. Unless specified otherwise, as used herein "polyisobutylene polymer" refers to both the homopolymer and copolymer.

In some embodiments, the adhesive composition is a pressure sensitive adhesive before and/or after crosslinking the multifunctional component. Pressure sensitive adhesives are often characterized as having a storage modulus (G') at the application temperature, typically room temperature (e.g. 25° C.), of less than $3 \times 10^5$ Pa (0.3 MPa) at a frequency of 1 Hz. As used herein, storage modulus (G') and tan delta refers to the value obtained utilizing Dynamic Mechanical Analysis (DMA) per the test method described in the example. In some embodiments, the pressure sensitive adhesive composition has a storage modulus of less than $2 \times 10^5$ Pa, $1 \times 10^5$ Pa, $9 \times 10^4$ Pa, $8 \times 10^4$ Pa, $7 \times 10^4$ Pa, $6 \times 10^4$ Pa, $5 \times 10^4$ Pa, $4 \times 10^4$ Pa, or $3 \times 10^4$ Pa. In some embodiments, the composition has a storage modulus (G') of at least $2 \times 10^4$ Pa, $3 \times 10^4$ Pa, or $4 \times 10^4$ Pa. In some embodiments, the pressure sensitive adhesive has a tan delta no greater than 0.7, 0.6, 0.5, or 0.4 at 70° C. The pressure sensitive adhesive composition typically has tan delta of at least 0.01 or 0.05 at 70° C.

Pressure sensitive adhesives are often characterized as having a glass transition temperature "Tg" below 25° C.; whereas other adhesives may have a Tg of 25° C. or greater, typically ranging up to 50° C. As used herein, Tg refers to the value obtained utilizing Dynamic Mechanical Analysis (DMA) per the test method described in the examples. In some embodiments, the pressure sensitive adhesive composition has a Tg no greater than 20° C., 15° C., 10° C., 5° C., 0° C., or −5° C. The Tg of the pressure sensitive adhesive is typically at least −40° C., −35° C., −30° C., −25° C., or −20° C.

Pressure sensitive adhesive are often characterized as having adequate adhesion. In some embodiments, the peel adhesion (e.g. to glass), as measured according to the test method described in the examples, is at least 0.1, 0.5, 1, 2, 3, 4, or 5 N/cm ranging up to for example 15, 16, 17, 18, 19, or 20 N/dm, or greater.

In some embodiments, the polyisobutylene polymer component comprises a polyisobutylene polymer comprising at least 90, 91, 92, 93, 94, 95, 96, 97, 98, or 99 mole-% of polymerized units of isobutylene.

In other embodiments, the polyisobutylene polymer component comprises a polyisobutylene copolymer that comprises at least 50, 55 or 60 mole-% of polymerized units of polyisobutylene. In some embodiments, the copolymer further comprises polymerized units derived from 1-butene and/or 2-butene. The polymerized units derived from 1-butene and/or 2-butene are typically present in an amount of at least 1, 5, 10, 15 or 20 mole-% ranging up to 30, 35, 40, 45 or 50 wt.-% of the polyisobutylene copolymer. Polyisobutylene copolymers further comprising polymerized units derived from 1-butene and/or 2-butene may be characterized as "polybutene".

The polyisobutylene polymer component may contain at least two polymers where the first polyisobutylene polymer comprises a higher concentration of polymerized units derived from 1-butene and/or 2-butene than the second polyisobutylene polymer.

Other examples polyisobutylene copolymers include copolymers of isobutylene and isoprene, copolymers of isobutylene and butadiene, and halogenated butyl rubbers obtained by brominating or chlorinating these copolymers. However, the polyisobutylene copolymers can be free of halogenated butyl rubbers, the halogen (e.g. chloride, bromide) content being less than 1, 0.5, 0.25, 0.1, 0.01, or 0.001 mole percent of the polyisobutylene polymer.

In some embodiments, the polyisobutylene polymer may be characterized as butyl rubber. Butyl rubber is a copolymer of isobutylene and a small amount of isoprene, providing for a highly saturated backbone. In some embodiments, the mol % of isoprene of the butyl rubber is at least 0.5 or 1 mol %. In some embodiments, the mol % of isoprene of the butyl rubber is no greater than 3, 2.5, 2 or 1.5 mol %. In some embodiments, the Mooney viscosity ML 1+8− at 125° C. (ASTM D1646) of the butyl rubber is typically at least 25, 30, 35, or 40. In some embodiments, the Mooney viscosity ML 1+8− at 125° C. of the butyl rubber is typically no greater than 60 or 55. Butyl rubber is commercially available from various suppliers such as Exxon.

The polyisobutylene copolymer typically does not contain a structural unit derived from styrene. Further, the polyisobutylene copolymers are typically random copolymers. In typical embodiments, the adhesive composition does not comprise block copolymers such as styrene-isoprene-styrene (SIS), styrene-butadiene-styrene (SBS), and styrene-isobutylene-styrene (SIBS) block copolymers.

Polyisobutylene polymer(s) can contain a trace amount of C8-C28 oligomers. The concentration of such is generally less than 0.15, 0.10, or 0.05 wt.-% based on the total weight of the polyisobutylene polymer.

It is appreciated that the polyisobutylene polymer(s) may have a very small concentration of reactive double bonds or other functional groups that are residual of the polymerization method of making the polyisobutylene polymer. The concentration of such reactive double bonds or other functional groups is typically less than 5, 4, 3, or 2 mole %.

Polyisobutylene polymer(s) typically have a density of 0.92 g/cc. However, depending on the content of 1-butene and/or 2-butene and/or other alkene comonomer(s), the density may be 0.91 or lower. Further, the glass transition temperature of such polymers is typically −64° C. to −65° C. as measured by Differential Scanning calorimetry (DSC). Polyisobutylene polymer(s) typically cold flow at room temperature.

Thus, depending on the selection of polyisobutylene polymer(s), the polyisobutylene polymer component comprises at least 50, 55, 60, 65, 70, 75, 80, 85, 90, 95 wt.-% or greater of polymerized units of polyisobutylene.

Polyisobutylene polymers are commercially available from several manufacturers. Homopolymers are commercially available, for example, under the trade designation OPPANOL (e.g., OPPANOL B12, B15, B30, B50, B80, B100, B150, and B200) from BASF Corp. (Florham Park, N.J.). These polymers often have a weight average molecular weight in the range of about 40,000 to 1,000,000 g/mole or greater. Still other polyisobutylene polymers are commercially available in a wide range of molecular weights from United Chemical Products (UCP) of St. Petersburg, Russia; Exxon Chemical Company as the trade designation VISTANEX™; and B.F. Goodrich as the trade designation "Hycar". Such polyisobutylene polymers are characterized as unfunctional polyisobutylene polymers, lacking functional groups such as amine, imide, anhydride, (meth)acrylate and vinyl ether.

In some embodiments, the polyisobutylene component comprises polyisobutylene polymers that include functional groups. Various functionalized PIB materials are commercially available. For example, polyisobutyleneamine having a number average molecular weight (Mn) of about 1,000 grams/mole and a molar mass distribution Mw/Mn=1.6) is commercially available from BASF Corporation (Florham Park, N.J.) under the trade designation "Kerocom™ PIBA03". Further, polyisobutene succinimide is available from BASF under the trade designation "Kerocom™ PIBSI". An anhydride-terminated polyisobutylene (Mn) of about 1,000 grams/mole) is available from BASF under the trade designation "Glissopal SA". Such materials can optionally be present in the adhesive composition at a concentration ranging from 1, 2, 3, 4, 5, 6, 7, 8, 9, or 10 wt.-% ranging up to 40 wt.-% of the adhesive composition. Depending on the functional group, the polyolefin copolymer may or may not be covalently bonded to the functional polyisobutylene polymer.

In other embodiments, the adhesive composition comprises little or no polyisobutylene polymers that include functional groups. Thus, the concentration of functionalized polyisobutylene polymer(s) is typically less than 1 wt.-% of the adhesive composition. Since the polyisobutylene does not include (meth)acrylate and vinyl ether functional groups in this embodiment, it is surmised that the multifunctional component is not covalently bonded to the polyisobutylene polymer component.

The polyisobutylene polymer can be characterized by molecular weight. As used herein, weight-average molecular weights are based on Gel Permeation Chromatography (GPC) utilizing polystyrene standards, per the test method described in previously cited U.S. patent application Ser. No. 62/479,527, filed Mar. 31, 2017.

In some embodiments, the adhesive comprises a polyisobutylene polymer having a weight average molecular weight of at least 25,000; 30,000; 35,000; 40,000; 45,000; or 50,000 g/mole. In some embodiments, the weight average molecular weight of the polyisobutylene polymer is less than 300,000; 250,000; 200,000; or 150,000 g/mole.

In other embodiments, the adhesive comprises a polyisobutylene polymer (e.g. butyl rubber) having a weight average molecular weight of at least 300,000; 350,000; 400,000; 450,000; or 500,000 g/mole. In some embodiments, the weight average molecular weight of the polyisobutylene polymer is less than 1,000,000 or 750,000 g/mole.

In some embodiments, the polyisobutylene component includes a blend of two or more polyisobutylene polymers, wherein each polyisobutylene polymer has a different weight average molecular weight (Mw).

For example, in some embodiments, polyisobutylene component includes a blend of a higher molecular weight polyisobutylene polymer (i.e. Mw greater than 300,000 g/mole) and an intermediate molecular weight polyisobutylene polymer (i.e. Mw less than 150,000 or 100,000 g/mole).

When the polyisobutylene component includes two or more polyisobutylene polymers, the average weight average molecular weight of the component can be approximated by the summation of the average molecular weight of each polyisobutylene polymer multiplied by the weight fraction of each polyisobutylene polymer within the polyisobutylene component. For example, if the polyisobutylene component contains about 58 wt.-% of a first polyisobutylene polymer having a weight average molecular weight of 75,000 and about 25 wt.-% of a second polyisobutylene polymer having a weight average molecular weight of 500,000 g/mole, the average weight average molecular weight can be approximated as 75,000×0.58+500,000×0.25=168,500 g/mole. Thus, in some embodiments, the polyisobutylene polymer component can comprise one or more polyisobutylene polymers such that the polyisobutylene polymer component has an average weight average molecular weight (Mw) is at least 125,000 g/mole, 150,000 g/mole, 200,000 g/mole, or 250,000 g/mole and ranging up to 400,000 g/mole; 450,000 g/mole to 500,000 g/mole. More than one low molecular weight PIB and more than one high molecular weight can be used.

The adhesive or OCA typically comprises at least 40, 45, or 50 wt.-% of polyisobutylene component. In some embodiments the adhesive or OCA comprises at least 55, 60, 65, 70, or 75 wt.-% of polyisobutylene component. The polyisobutylene polymer component provides the desired water vapor transmission rate (WVTR) properties. In some embodiments, the WVTR of a 51 micron adhesive layer is less than 20 or 15 or 10 grams/square meter/day (g/sq. m/day) at 40° C. and 90% relative humidity gradient. In other words, the WVTR can be at least 0.2, 0.25, 0.3, 0.35, or 0.4 g/sq. m/day per micron thickness of adhesive. In other embodiments, the WVTR of a 20 micron adhesive layer at 40° C. and a relative humidity gradient is less than 100, 75, 50, 25, 20, or 15 g/m$^2$/day.

The combination of the intermediate and high-molecular weight PIB resins is particularly advantageous as the combination provides a broad range of desirable characteristics. The intermediate molecular weight PIB facilitates processing during hot melt extruding, by lowering the melt viscosity of the compounded adhesive mixture. In solvent processing, the intermediate molecular weight facilitates faster diffusion of solvent during drying, thus enabling thicker coatings. Also, the intermediate molecular weight PIB imparts conformability to an OCA which enables ink step coverage, and proper wet-out on different surfaces, which are critical features in OCAs. High molecular weight imparts cohesion to an adhesive system which improves the adhesive forces, shear strength, tensile strength, room temperature and high temperature dimensional stability. These properties are critical for OCAs and differing applications may require broad range of composition to accommodate the particular characteristic for each particular application.

The adhesive or OCA further comprises a multifunctional component. The multifunctional component is generally miscible with the polyisobutylene component such that a higher storage modulus, lower creep compliance, or lower tan delta can be obtained in combination with low haze upon crosslinking of the multifunctional component. In some embodiments, the creep compliance (as determined by the test method described in the examples) is less than 60, 55, 40, 35, 30, 25, 20, 10, or 5 l/Pa×$10^4$.

The multifunctional component is typically a monomer or oligomer having a weight average molecular weight no greater than 10,000 or 5000 g/mole. In some embodiments, the multifunctional component has a number average molecular weight, as determined by NMR, of less than 3000, 2500, or 1000 g/mole. In some embodiments, the multifunctional component has a number average molecular weight, of at least 200, 300, 400, 500, or 600 g/mole. When the molecular weight of the multifunctional monomer is too high, the adhesive can exhibit higher haze.

The multifunctional component (e.g. oligomer or monomer) comprises at least two (e.g. terminal) ethylenically unsaturated groups selected from (meth)acryl or vinyl ether. The multifunctional component is aliphatic, comprising a hydrocarbon moiety with at least 12 contiguous carbon atoms. The maximum number of carbon atoms of the hydrocarbon moiety can be range up to 500 or 600 in the case of an oligomer having a molecular weight of 10,000 g/mole. In some embodiments, the number of carbon atoms of the hydrocarbon moiety is no greater than 300, 250 or 200. In some embodiments, the number of carbon atoms is no greater than 150, 100 or 50. In some embodiments, the multifunctional component may comprise a distribution of hydrocarbon moieties having different chain lengths. In such embodiment, the number of carbon atoms of the hydrocarbon moiety is typically the average number of carbon atoms. The hydrocarbon moiety may be linear, cyclic, or branched. When the hydrocarbon moiety is branched, at least a portion and typically most all of the side chains comprise at least two carbon atoms.

The hydrocarbon moiety may comprise small amounts of ethylenic unsaturation. The amount of ethylenic unsaturation is typically less than 0.085, 0.080, 0,075, 0.070, 0.065, 0.06, 0.055, or 0.05 wt. % of the total multifunctional component. (excluding the ethylenic unsaturation of the (meth)acryl or vinyl ether groups. In some embodiments, the multifunctional component may comprise a distribution of hydrocarbon moieties having different amounts of unsaturation. In such embodiment, the amount of ethylenic unsaturation is typically the average amount of ethylenic unsaturation. The hydrocarbon may optionally comprise heteroatoms provided that the inclusion of such does not increase the haze beyond 3, 2.5, 2, 1.5, 1 or 0.5% (as determined by the test method described in the examples.

The multifunctional component typically has a low acid number. The acid value can be determined by the titration with a base, and is defined as a value (milligram) of base (e.g. potassium hydroxide) required for neutralizing 1 g of the polymer. When the acid number is too high, the multifunctional component can be immiscible with the polyisobutylene component resulting is phase separation, inadequate adhesion, and/or high haze. In some embodiments, the acid number is typically no greater than 5, 4, 3, 2, 1, or 0.5 mgKOH/g A homopolymer of the multifunctional component typically has a low Tg and is flexible. In some embodiments, a homopolymer of the multifunctional component has a Tg (peak of Tan Delta as measured by Dynamic Mechanical Analysis) of no greater than 5, 10 or 15° C. In some embodiments, the Tg is at least 0° C. In some embodiments, a homopolymer of the multifunctional component has an elongation of at least 5 or 10% when measured with standard tensile and elongation testing.

In some embodiments, the multifunctional component is a low viscosity liquid at 25° C. For example, the viscosity may be less than 2000, 1500, 1000, 500 or 250 cPs. In other embodiments, the multifunctional component has a melting temperature of 50 to 75° C. as measured according to DSC at a rate of 10 degrees ° C./minute.

In some embodiments, the multifunctional component has a refractive index of 1.47 or less.

In some embodiments, the multifunctional component may be characterized as a hydrophobic acrylate ester. In other embodiments, the multifunctional component may be characterized as an (e.g. (meth)acrylate) functionalized poly (butadiene). The hydrocarbon moiety has a combination of unsaturated and saturated repeat units as depicted in the following formulas:

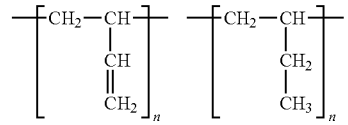

The number of unsaturated repeat units is sufficiently low such that (e.g. (meth)acrylate) functionalized poly(butadiene) has a low concentration of unsaturation as previously described. When the amount of unsaturation or molecular weight (e.g. viscosity) is too high, the adhesive can undesirably exhibit higher haze.

In some embodiments, the adhesive may optionally further comprise a monofunctional component, having a single (e.g. terminal) ethylenically unsaturated groups selected from (meth)acryl or vinyl ether.

In some embodiments, the multifunctional component and monofunctional component (when present) comprises at least 6, 7, 8, 9, or 10 carbon atoms per ethylenically unsaturated group. In some embodiments, the multifunctional component or monofunctional component (when present) comprises at least 11, 12, 13, 14, 15, 16, 17, 18, 19, 20 or greater carbon atoms per ethylenically unsaturated group. In some embodiments, the multifunctional component or monofunctional component when present comprises at least 50, 100, 200, or 300 carbon atoms per ethylenically unsaturated group.

The adhesive composition may optionally comprise one or more additives such as tackifiers, plasticizers (e.g. oils, polymers that are liquids at 25° C.), antioxidants (e.g., hindered phenol compounds, phosphoric esters, or derivatives thereof), ultraviolet light absorbers (e.g., benzotriazole, oxazolic acid amide, benzophenone, or derivatives thereof), in-process stabilizers, anti-corrosives, passivation agents, processing aids, elastomeric polymers (e.g. block copolymers), scavenger fillers, nanoscale fillers, transparent fillers, desiccants, crosslinkers, pigments, etc. These additives may be used singly and in combination of two or more kinds thereof. The total concentration of such additives ranges from 0-60 wt.-% of the total adhesive composition.

When it is desired for the adhesive composition to be transparent, the adhesive is typically free of fillers having a particle size greater than 100 nm that can detract from the transparency of the adhesive composition. In this embodiment, the total amount of filler of the adhesive composition is no greater than 10, 9, 8, 7, 6, 5, 4, 3, or 2 wt.-% solids of the adhesive composition. In some favored embodiments, the adhesive composition comprises no greater than 1, 0.5, 0.1, or 0.05 wt.-% of filler.

However, in other embodiments, the adhesive composition may comprise higher amounts of inorganic oxide filler such as fumed silica.

In typical embodiments, the adhesive composition does not comprise acid-reactive components such as epoxy compounds that would result in crosslinking of the acid groups.

The adhesive or OCA compositions disclosed herein may optionally comprise a tackifier. Addition of tackifiers allows the composition to have higher adhesion which can be beneficial for some applications where adhering to different substrates is a critical requirement. The addition of tackifiers increases the Tg of the composition and can reduce its storage modulus at room temperature, thus making it less elastic and more flowable, such as what is required for compliance to an ink step during lamination. However, that same addition of a tackifier can shift the visco-elastic balance too much towards the viscous behavior, such as in those cases where minimal creep and thus less flow is required. The addition of tackifiers is thus optional, and its presence and concentration are dependent on the particular application.

Suitable tackifiers include hydrocarbon resins and hydrogenated hydrocarbon resins, e.g., hydrogenated cycloaliphatic resins, hydrogenated aromatic resins, or combinations thereof. Suitable tackifiers are commercially available and include, e.g., those available under the trade designation ARKON (e.g., ARKON P or ARKON M) from Arakawa Chemical Industries Co., Ltd. (Osaka, Japan); those available under the trade designation ESCOREZ (e.g., ESCOREZ 1315, 1310LC, 1304, 5300, 5320, 5340, 5380, 5400, 5415, 5600, 5615, 5637, and 5690) from Exxon Mobil Corporation, Houston, TX; and those available under the trade designation REGALREZ (e.g., REGALREZ 1085, 1094, 1126, 1139, 3102, and 6108) from Eastman Chemical, Kingsport, TN. Because of their low color and environmental stability, these tackifiers are particularly advantageous for OCA type applications.

The tackifier can have any suitable softening temperature or softening point. The softening temperature is often less than 200° C., less than 180° C., less than 160° C., less than 150° C., less than 125° C., or less than 120° C. In applications that tend to generate heat or where the adhesive bond is exposed to heat, however, the tackifier is often selected to have a softening point of at least 75° C. Such a softening point helps minimize separation of the tackifier from the rest of the adhesive composition when the adhesive composition is subjected to heat such as from an electronic device or component. The softening temperature is often selected to be at least 80° C., at least 85° C., at least 90° C., or at least 95° C. In applications that do not generate heat or the adhesive bond is not exposed to heat, however, the tackifier can have a softening point less than 75° C.

In some embodiments the adhesive composition comprises a tackifier. The concentration of tackifier can vary depending on the intended (e.g. pressure sensitive) adhesive composition. In some embodiments, the amount of tackifier is at least 1, 2, 3, 4, 5, 6, 7, 8, 9, 10, 11, 12, 13, 14, 15 wt.-%. The maximum amount of tackifier is typically no greater than 60, 55, 50, 45, 40, 35, or 30 wt.-%. Increasing the (e.g. solid at 25° C.) tackifier concentration typically raises the Tg of the adhesive. In other embodiments, the adhesive composition comprises little or no tackifier. Thus, the concentration of tackifier is less than 5, 4, 3, 2, 1, 0.5, or 0.1 wt.-%.

In addition, liquid rheology modifiers, such as plasticizers or oils may also be used. For example, mineral oil (Kaydol), napthenic oil (Calsol 5550), and paraffinic oil (Hyprene P100N) may be used. The benefit of using a plasticizer/oil in combination with a tackifier is that it allows one to reduce the glass transition temperature of the composition in addition to reducing the storage modulus of the composition. This imparts higher flow characteristics to the composition which is advantageous in applications where conformability to features like ink steps, flex connects etc., is required. In applications requiring defect-free lamination coverage of an ink-step, adhesive compositions with a higher creep compliance are known to provide better ink-step coverage. A creep compliance of greater than $1.5 \times 10^4$ 1/Pa has been found most desirable for optimal lamination coverage on commercial ink-step features.

The adhesive or OCA compositions disclosed herein may further include a UV blocking agent. The UV blocking package includes UV absorbents or combination of UV absorbents and light stabilizers. Examples of suitable UV absorbers include, but are not limited to, benzophenone, benzotriazole, triazines or combination of them. Examples of light stabilizers include, but are not limited to, hindered amine light stabilizers (HALS). The adhesive sheet of the present invention has neutral color and low haze, which is required for the optically clear adhesive. The adhesive sheet of this invention has a sharp UV cut-off, examples of UV cut-off include, but are not limited to, transmittance (% T) less than 1.5% at 380 nm wavelength, 84% at 400 nm wavelength and higher than 96% at 410 nm wavelength and above, which can block UV light or even purple or blue light efficiently, but does not cause too much yellow color.

In some embodiments, the adhesive compositions are prepared by dissolving the polyisobutylene polymer, and other optional components in an organic solvent. Suitable solvents include for example alkanes, ethyl acetate, toluene and tetrahydrofuran. In other embodiments, the adhesive composition may be characterized as hot-melt adhesive. Such adhesive composition are typically applied from the melt and are solvent-free. Alternatively, a solidified hot melt or dried solvent based adhesive may be applied to a substrate or between substrates. The adhesive may be heated after application to the substrate as will subsequently be described.

The thickness of the adhesive layer is typically at least 10, 15, 20, or 25 microns (1 mil) ranging up to 500 microns (20 mils) thickness. In some embodiments, the thickness of the adhesive layer is no greater than 400, 300, 200, or 100 microns. The adhesive composition can be coated in single or multiple layers. The layers may be continuous or discontinuous.

The adhesive composition may be coated upon a variety of flexible and inflexible backing materials using conventional coating techniques to produce a single coated or double coated adhesive tape, and adhesive transfer tapes. Generally, adhesive transfer tapes comprise a layer of adhesive disposed on a release liner. Such products can be formed by applying (e.g., coating, casting, or extruding) the adhesive onto a release liner, and drying the adhesive if an organic solvent in present.

The tape may further comprise a release material or release liner. For example, in the case of a single-coated tape, the side of the backing surface opposite that where the adhesive is disposed is typically coated with a suitable release material. Release materials are known and include materials such as, for example, silicone, polyethylene, polycarbamate, polyacrylics, and the like. For double coated tapes, a second layer of adhesive is disposed on the opposing surface of the backing surface. The second layer may also comprise the adhesive composition as described herein or a different adhesive composition.

Flexible substrates are defined herein as any material which is conventionally utilized as a tape backing or may be of any other flexible material. Examples include, but are not limited to polymeric films, woven or nonwoven fabrics (e.g. scrim); metal foils, foams (e.g., polyacrylic, polyethylene, polyurethane, neoprene), and combinations thereof (e.g. metalized polymeric film). Polymeric film include for example polypropylene (e.g. biaxially oriented), polyethylene (e.g. high density or low density), polyvinyl chloride, polyurethane, polyester (polyethylene terephthalate), polycarbonate, polymethyl(meth)acrylate (PMMA), polyvinylbutyral, polyimide, polyamide, fluoropolymer, cellulose acetate, cellulose triacetate, and ethyl cellulose. The woven or nonwoven fabric may comprise fibers or filaments of synthetic or natural materials such as cellulose (e.g. tissue), cotton, nylon, rayon, glass, ceramic materials, and the like. A substrate may be bonded by the adhesive composition or (e.g. transfer, single-sided, or double-coated tape described herein. The substrate may comprise the same materials as just described for the backing.

One method of bonding comprises providing a first substrate and contacting a surface of the first substrate with the (e.g. pressure sensitive) adhesive. In this embodiment, the opposing surface of the adhesive is typically temporarily covered by a release liner.

In other embodiments, the method further comprises contacting the opposing surface of the (e.g. pressure sensitive) adhesive (e.g. layer) to a second substrate. The first and second substrate may be comprised of various materials as previously described such as metal, an inorganic material (e.g. glass), an organic polymeric material, or a combination thereof.

In some methods of bonding, the substrate, (e.g. pressure sensitive) adhesive composition, or combination thereof may be heated to reduce the storage modulus (G') and thereby increase the bond strength formation. The substrate and/or (e.g. pressure sensitive) adhesive may be heated to a temperature up to 30, or 35, or 40, or 45, or 50, or 55, or 60, or 65 or 70° C. In some embodiments, the substrate(s) together with the adhesive bonded to the substrate(s) by means of the initial peel adhesion strength at ambient temperature (e.g. 25° C.) is heated in an oven to the desired temperature. In other embodiments, the substrate and/or (e.g. pressure sensitive) adhesive is heated by means of a hot air gun.

In some embodiments, the (e.g. pressure sensitive) adhesive composition described herein is optically clear. Thus, certain articles can be laminates that include an optically clear substrate (e.g., an optical substrate such as an optical film) and an optically clear adhesive layer disposed on at least one major surface of the optically clear substrate. The laminates can further include a second substrate permanently or temporarily attached to the pressure-sensitive adhesive layer and with the pressure-sensitive adhesive layer being positioned between the optically clear substrate and the second substrate.

In one embodiment, the laminate may be a removable or permanent surface protection film. In some embodiments, the tapes and protective films can be utilized for (e.g. illuminated) displays that can be incorporated into household appliances, automobiles, computers (e.g. tablets), and various hand-held devices (e.g. phones). In other embodiments, the adhesive coated film may be suitable for architectural applications, glazing (e.g., windows and windshields), and graphic film applications.

In some embodiments, the (e.g. pressure sensitive) adhesive and optically clear substrate (e.g. transparent film) have a transmission as measured according to the test method described in the examples of visible light (410 nm) of at least 90 percent for a layer of adhesive having a thickness of 50 micrometers. In some embodiments, the transmission is at least 91, 92, 93, 94, 95, 96, 97, 98, or 99%.

In some example laminates in which an optically clear pressure-sensitive adhesive layer is positioned between two substrates, at least one of the substrates is an optical film, a display unit (e.g., liquid crystal displays (LCDs), organic light emitting displays (OLEDs), a touch sensor, or a lens. Optical films intentionally enhance, manipulate, control, maintain, transmit, reflect, refract, absorb, retard, or otherwise alter light that impinges upon a surface of the optical film. Optical films included in the laminates include classes of material that have optical functions, such as polarizers, interference polarizers, reflective polarizers, diffusers, colored optical films, mirrors, louvered optical film, light control films, transparent sheets, brightness enhancement film, anti-glare, and anti-reflective films, and the like. Optical films for the provided laminates can also include retarder plates such as quarter-wave and half-wave phase retardation optical elements. Other optically clear films can include clear plastics (such as polyester, cyclic olefin copolymer, clear polyimide, polycarbonate, or polymethylmethacrylate), anti-splinter films, and electromagnetic interference filters. Some of these films may also be used as substrates for ITO (i.e., indium tin oxide) coating or patterning, such as use those used for the fabrication of touch sensors. The low water uptake and WVTR of the adhesives described herein provide a stable, low dielectric constant OCA which can be very advantageous for use in touch sensor applications, both to protect the sensor and integrating conductors from the environment and corrosion, and also to minimize electronic noise communication with the sensor. In some embodiments, the (e.g. pressure sensitive) adhesive and (e.g. transfer and double-coated) tapes described herein are suitable for bonding internal components or external components of an optical elements such as illuminated display devices such as liquid crystal displays ("LCDs") and light emitting diode ("LEDs") displays such as cell phones (including Smart phones), wearable (e.g. wrist) devices, car navigation systems, global positioning systems, depth finders, computer monitors, notebook and tablet computer displays. Other types of optical elements include projection (e.g. lens) components, photonic components, and polarizing beam splitters.

In some embodiments, the (e.g. pressure sensitive) adhesive is suitable for use as an encapsulating composition for use in an electronic device as described for example in US2009/0026924; incorporated herein by reference.

Specifically, the (e.g. pressure sensitive) adhesive can be used as a sealing member for electronic devices, for example, organic devices such as an organic transistor, an organic memory, and an organic EL element; liquid crystal displays; electronic paper; thin film transistors; electrochromic devices; electrochemical light-emitting devices; touch panels; solar batteries; thermoelectric conversion devices; piezoelectric conversion devices; electric storage devices; and the like.

In addition to various optics-related applications and/or electronic display assembly applications, the adhesive composition described herein can be used in a variety of other articles. The following, non-limiting, examples further describe exemplary adhesives and adhesive articles of the present disclosure, as well as exemplary methods for making such adhesives and adhesive articles. All percents are by weight unless otherwise indicated.

Examples

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis.

Materials

The materials with their sources were as listed in Table 1. Unless stated otherwise, all other reagents were obtained, or are available from fine chemical vendors such as Sigma-Aldrich Company, St. Louis, Missouri, or may be synthesized by known methods.

TABLE 1

| Designation | Description | Source |
| --- | --- | --- |
| B268 | Butyl rubber B268S | Exxonmobil, Houston, TX |
| Oil | Paralux process Oil 6001 | Chevron Products Company, San Ramon, CA |
| B15 | Polyisobutylene Oppanol B15 | BASF Corporation, Florham Park, NJ |
| Esc | Cycloaliphatic hydrocarbon resin Escorez 5340 | Exxonmobil, Houston, TX |
| SR 833S | Tricyclodecane dimethanol diacrylate | Sartomer, Exton, PA |
| CN 309 | Aliphatic hydrophobic acrylate ester | Sartomer, Exton, PA |
| CN308 | Acrylate ester oligomer C-18 Acrylate | Sartomer, Exton, PA |
| TPO-L | Trimethylbenzoylphenylphosphinsaeureethylester | BASF Corporation, Florham Park, NJ |
| XL-330 | Aziridine crosslinker | Stahl, Netherlands |
| RF 22N | Release liner | SKC Haas, Korea |
| RF 02N | Release liner | SKC Haas, Korea |
| Heptane | Heptane (Solvent) | EMD Millipore Corp., Billerica, MA |

Method for Haze Measurement

Test specimens were prepared by cleaning the LCD (liquid crystal display) glass three times with IPA (isopropyl alcohol) and completely drying the surface with a KIMWIPE (KIMTECH by Kimberly-Clark, Irving, TX). Each test specimen (50 microns thick) was cut to a size large enough to cover the entrance port. The clear liner was removed and the adhesive was laminated on the LCD glass with four passes of a small rubber hand roller. The sample should be free of visible distinct internal voids, particles, scratches, and blemishes. Then test sample was then placed in a 65° C., 90% relative humidity testing chamber. In 10 minutes, the other clear liner was removed and the haze was measured according to ASTM D 1003-92 against the background of the LCD glass with UltraScan Pro (Hunterlab, Reston, VA).

Method for Determination of Storage Modulus, Tan Delta and Creep Compliance by Dynamic Mechanical Analysis Dynamic mechanical analysis ("DMA") of adhesive samples was carried out using a rheometer (obtained from TA Instruments, New Castle, DE, under the trade designation "AR2000 PARALLEL PLATE RHEOMETER") to characterize the physical properties of each sample as a function of temperature. For each sample, 50 micrometer thick sheets of the polymerized adhesive sample were laminated together to achieve a 1 mm thick slab. A circular punch with a diameter of 8 mm was used to cut a sample from this slab which was then centered between the 8 mm diameter parallel plates of the rheometer. The temperature was then equilibrated at the test temperatures for 2 minutes at a nominal axial force of 0 grams+/−15 grams. After two minutes, the axial force controller was disabled in order to maintain a fixed gap during the remainder of the test.

Samples were then taken from 25° C. to −50° C. and then from −50° C. to 150° C. with a temperature change rate of 3° C./min. G' at 25° C. and tan δ at 70° C. were recorded from this measurement.

To determine creep compliance, stress of 8,000 Pascals was applied to the sample for 300 seconds, and the creep compliance (J) at 287 seconds was recorded.

Method for Determination of the Water Vapor Transmission Rate (WVTR)

Water Vapor Transmission Rate was measured of a 50 micron thick sample of crosslinked adhesive according to ASTM E398-13 using a PERMATRAN-W 1/50 G testing instrument setup from Mocon (Brooklyn Park, MN). The test conditions were 40° C. and 90% relative humidity gradient.

180° Peel Test at Room Temperature at 300 Millimeters/Minute on Glass

Single layer pressure sensitive adhesive films were laminated prior to testing on a 50 micrometer (μm) thick PET backing (obtained under the trade designation HOSTAPHAN RN 50 from Mitsubishi Chemical Holding Groups (Wiesbaden, Germany). The hereby obtained pressure sensitive adhesive strips were cut out in the machine direction from the pressure sensitive adhesive film sample material to provide test strips with a width of 25.4 millimeters (mm) and a length of 3050 millimeters. Glass panels were cleaned with a 50:50 isopropanol/water mixture prior to use.

For test sample preparation, the liner was first removed from the adhesive side and the tape was applied to the clean test panel using light finger pressure. The test samples were then rolled four times with a standard FINAT test roller (weight 2.0 kg, Mecmesin Corporation, Sterling, VA at a speed of approximately 10 mm per second to obtain intimate contact between the adhesive and the surface. After applying the pressure sensitive adhesive assembly strips to the test panel, the test samples were allowed to dwell for 24 hours at ambient room temperature (23° C.+/−2° C., 50% relative humidity+/−5%) prior to testing at 85° C. or room temperature.

For 180° peel testing, the test panel was clamped in the lower movable jaw of an Instron tensile tester (Instron 3365, Instron, Norwood, MA. The pressure sensitive adhesive film strips were folded back at an angle of 180° and the free end was clamped in the upper jaw of the tensile tester in a configuration commonly utilized for 180° measurements. The tensile tester was set at 300 mm per minute jaw separation rate. Test results were expressed in Newton per cm (N/cm). The peel values were the average of three 180° peel measurements.

Preparation of Comparative Example 1 (CE 1): In CE 1, 8 g of B 15 SF, 2 g of Escorez 5340, and 15 g of Heptane were added in a glass vial. The vial was sealed and contents were mixed overnight. The solution was then coated on a 50 μm thick siliconized polyester release liner, RF02N (SKC Haas, Korea) using a knife coater with a gap of 8 mil. The coated sample was placed in an oven at 70° C. for 15 minutes. This coated sample was then irradiated with an H-bulb with a total dose of 1200 mJ/cm$^2$ of UV-A.

Other examples that further included a multifunctional component were prepared in the same manner as CE 1 using the amounts of materials specified in the following Tables 2 and 3.

TABLE 2

| Example | B15 (wt %) | Esc (wt %) | TPO-L (pph) | CN309 (pph) | CN308 (pph) | SR833S (pph) | C18-Acrylate (pph) |
|---|---|---|---|---|---|---|---|
| CE1 | 8 | 2 | | | | | |
| CE2 | 8 | 2 | 0.1 | | | 2 | |
| E1 | 8 | | 0.1 | 2 | | | |
| E2 | 8 | 2 | 0.1 | 2 | | | |
| CE3 | 8 | 2 | 0.1 | | 2 | | |
| E4 | 8 | 2 | | | | | 2 |
| E5 | 8 | 2 | 0.1 | 1 | | | 1 |

TABLE 3

| Example | B15 (wt %) | B268 (wt %) | Oil (wt %) | TPO-L (pph) | XL-330 (pph) | CN309 (pph) | SR833S (pph) |
|---|---|---|---|---|---|---|---|
| CE4 | | 7 | 3 | | | | |
| CE5 | | 7 | 3 | 0.1 | | | 2 |
| E6 | | 7 | 3 | 0.1 | | 2 | |
| E7 | | 7 | 3 | | 0.1 | 2 | |
| CE6 | 3 | 7 | | | | | |
| E8 | 3 | 7 | | | 0.1 | 2 | |

TABLE 4

| Ex. | Creep (1/Pa) E-04 | Haze (%) | Tan delta | WVTR (g/m$^2$/day) | G'@ 25C (Pa) | Peel strength (N/cm) |
|---|---|---|---|---|---|---|
| CE1 | 40.1 | 0.13 | | 13.2 | | |
| CE2 | 5.21 | 3.12 | | | | |
| E1 | 4.32 | 0.24 | | | | |
| E2 | 5.31 | 0.19 | | 19.8 | | |
| CE3 | | 4.21 | | | | |
| E4 | 53.12 | 0.29 | | | | |
| E5 | | 0.21 | | | | |
| CE4 | | 0.31 | 0.7 | | 189223 | 9.2 |
| CE5 | | 3.89 | 0.49 | | | |

TABLE 4-continued

| Ex. | Creep (1/Pa) E-04 | Haze (%) | Tan delta | WVTR (g/m$^2$/day) | G'@ 25C (Pa) | Peel strength (N/cm) |
|---|---|---|---|---|---|---|
| E6 | | 0.29 | 0.41 | | 201197 | 10.4 |
| E7 | | 0.27 | 0.24 | | | |
| CE6 | | 0.32 | 0.61 | | | |
| E8 | | 0.36 | 0.22 | | | 6.7 |

CN308 and CN309 were analyzed via NMR. One of ordinary skill in the art appreciates that the first step is to collect a quantitative proton NMR. A deuterated solvent is used, essentially free of residual water, to ensure that the aliphatic integral area is not artificially high. From the spectra, peaks associated with acrylate, CH2O ester, unsaturation and aliphatic regions can be identified and mathematically integrated. Since these materials are known to be diacrylates, one can normalize acrylate integral values in the proton NMR to 6. For the aliphatic integral value, the CH2O ester signal was included. The corresponding integral values for the acrylate, aliphatic, and unsaturated were normalized with the appropriate number of protons in order to calculate the number of moles for each component. For example, the normalization number for acrylate is three, aliphatic is four, and unsaturation is two. The moles of end groups (in this case acrylates) is two, representing the total number of end groups in the sample. The average molecular weight is calculated by multiplying the number of moles by the molecular weight for that functional group. For example, there are 2 moles of acrylate, so this multiplied by molecular weight of acrylate (72). The number of moles of aliphatic and unsaturated are also multiplied by the respective molecular weight (28 and 26 respectively). Summing the weights of each component calculates the average molecular weight. Using this technique, CN308 was determined to have a number average molecular weight of 3301 g/mole and 0.088 wt. % of unsaturation excluding the acrylate groups. The CN309 was determined to have a number average molecular weight of 645 g/mole and 0.022 wt. % of unsaturation excluding the acrylate groups.

What is claimed is:

1. An adhesive composition comprising:
   a polyisobutylene polymer component; and
   up to 30 wt.-% of at least one aliphatic multifunctional component comprising at least two ethylenically unsaturated groups selected from (meth)acryl or vinyl ether; wherein the aliphatic multifunctional component comprises a linear or branched hydrocarbon moiety with at least 18 contiguous carbon atoms; wherein when the hydrocarbon moiety is branched, the hydrocarbon moiety comprises side chains with at least two carbon atoms excluding the (meth)acryl and vinyl ether groups, and comprises less than 0.08 wt. % of ethylenic unsaturation excluding the unsaturation of the (meth)acryl and vinyl ether; wherein the aliphatic multifunctional component has a number average molecular weight, as determined by Nuclear Magnetic Resonance (NMR), of less than 3000, 2500 or 1000 g/mole; and the aliphatic multifunctional component is compatible with the adhesive composition such that the adhesive composition at a thickness of 20 microns has a haze of less than 3% when the adhesive composition is crosslinked.

2. The adhesive composition of claim 1 wherein the polyisobutylene polymer component comprises unfunctionalized polyisobutylene polymer, butyl rubber or a mixture thereof.

3. The adhesive composition of claim 2 wherein the polyisobutylene polymer has a weight average molecular weight ranging from 50,000 to 1,000,000 g/mole.

4. The adhesive composition of claim 1 wherein the adhesive composition comprises 40-95 wt. % of polyisobutylene polymer component.

5. The adhesive composition of claim 2 wherein the adhesive composition comprises at least 55, 60, or 65 wt. % of unfunctionalized polyisobutylene polymer having a weight average molecular weight ranging from 50,000 to 300,000 g/mole.

6. The adhesive composition of claim 2 wherein the adhesive composition comprises at least 55, 60, or 65 wt. % of butyl rubber having a weight average molecular weight ranging from 300,000 to 1,000,000 g/mole.

7. The adhesive composition of claim 2 wherein the adhesive composition comprises a blend of unfunctionalized polyisobutylene polymer having a weight average molecular weight ranging from 50,000 to 300,000 g/mole and butyl rubber having a weight average molecular weight ranging from 300,000 to 1,000,000 g/mole.

8. The adhesive composition of claim 1 wherein the aliphatic multifunctional component has a density at 25° C. of at least 0.88, 0.89, 0.90, 0.91, or 0.92 g/cc.

9. The adhesive composition of claim 1 wherein the multifunctional component has an acid number from 1-5.

10. The adhesive composition of claim 1 wherein the adhesive composition further comprises a monofunctional component comprising a (meth)acrylate or vinyl ether group.

11. The adhesive composition of claim 1 further comprising a tackifier, plasticizer, or a combination thereof.

12. The adhesive composition of claim 11 wherein the tackifier is non-hydrogenated or hydrogenated aliphatic hydrocarbon tackifier.

13. The adhesive composition of claim 1 wherein the adhesive composition at a thickness of 50 microns has a WVTR when measured at 40° C. and a relative humidity gradient of 90% of less than 100 $g/m^2/day$.

14. An article comprising the adhesive composition of claim 1, wherein the adhesive composition is disposed on a substrate.

15. The article of claim 14 wherein one or more of the substrates is a release liner or the composition is disposed between two substrates.

16. The article of claim 14 wherein one or more of the substrates is an optical film, a display unit, a touch sensor, or a lens.

* * * * *